C. P. PUES.
STEEL GAME TRAP.
APPLICATION FILED APR. 3, 1916.

1,231,065.

Patented June 26, 1917.

Inventor:
Chester Peter Pues

UNITED STATES PATENT OFFICE.

CHESTER PETER PUES, OF NAVARINO, WISCONSIN.

STEEL GAME-TRAP.

1,231,065.

Specification of Letters Patent.   Patented June 26, 1917.

Application filed April 3, 1916.   Serial No. 88,573.

*To all whom it may concern:*

Be it known that I, CHESTER P. PUES, a citizen of the United States, residing at Navarino, in the county of Shawano and State of Wisconsin, have invented a new and useful Steel Game-Trap, of which the following is a specification.

The present invention appertains generally to traps, and relates more particularly to a trap designed for use in water for catching fur bearing animals, fish, water fowl, and the like, the trap being of novel construction to enhance its utility and efficiency, and to render the construction comparatively simple and inexpensive.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the drawing, wherein:—

Figure 1:
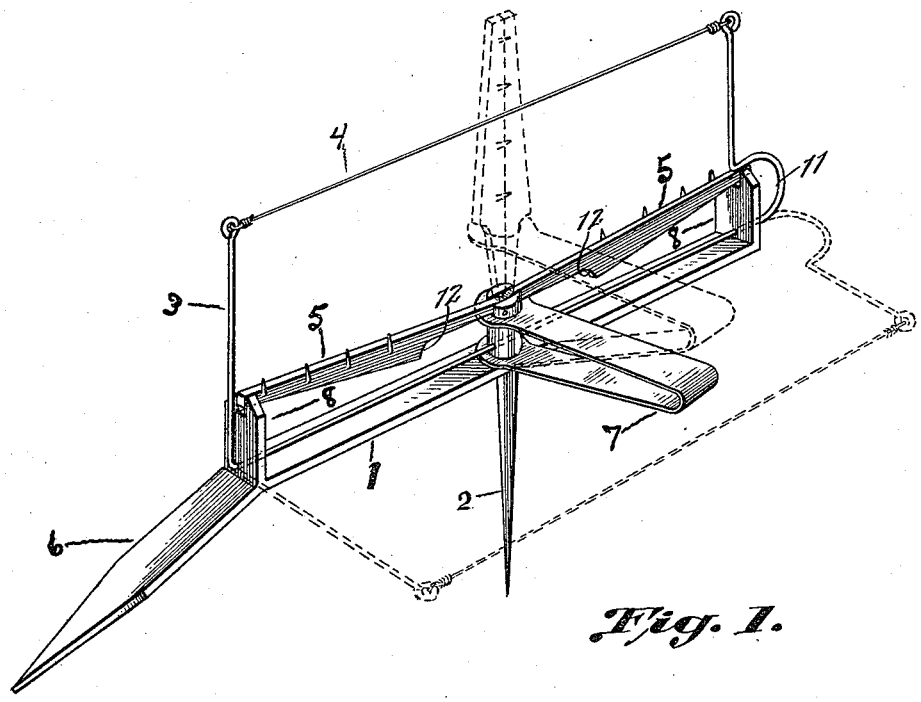
Figure 1 is a perspective view of the trap showing the parts set in full lines and released in dotted lines.
Figure 2:
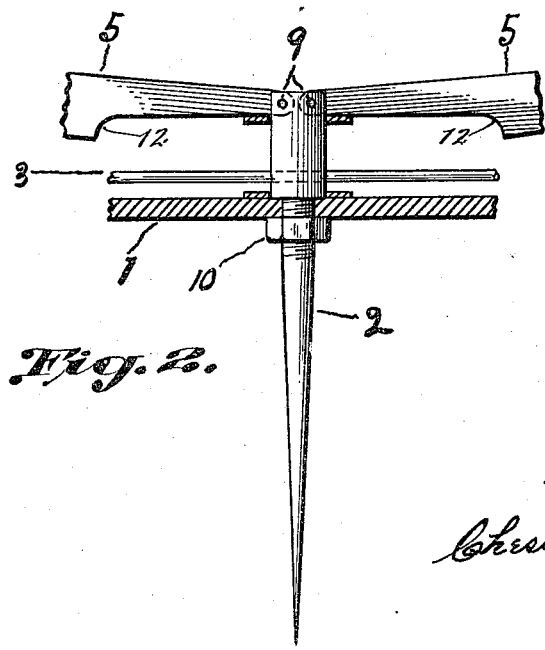
Fig. 2 is an enlarged fragmental detail view of the adjacent pivoted ends of the jaws and accompanying parts.

In carrying out the invention, the frame of the trap embodies an elongated bar 1 preferably used in a horizontal position, and a shank or spur 2 engaged downwardly through the bar 1 and providing an anchor to enter the bed of the body of water to assist in holding the trap in place, a nut 10 or other retaining element being engaged upon the spur 2 for clamping it to the bar 1. The butt portion of the spur or shank 2 projects above the bar 1, and the ends of the bar 1 are provided with upturned notched ear 8 through which a trigger wire or rod 3 is journaled, said rod also being journaled through the upper portion of the shank 2 and extending longitudinally above the bar 1. The end portions of the rod 3 are extended at an angle, and the ends of the trigger rod are connected by a wire 4 or other element of small gage or diameter which cannot be seen readily. The bar 1 is provided at one end with a spur or prong 6 extending therefrom at a suitable angle, and adapted to be inserted into the bank of the body of water for holding the bar 1 in place in connection with the shank 2.

A pair of jaws 5 is provided, the same having their adjacent ends pivoted, as at 9, to the upper end of the shank 2, and said jaws are preferably provided with teeth. The free ends of the jaws enter the notches of the ears 8 when the jaws are swung apart and downwardly to a substantially horizontal position above the bar 1. One arm of the trigger rod 3 has an outstanding loop or offset portion 11 adapted to engage over the free end of one jaw 5, as seen in full lines in Fig. 1, to hold the trap in set position with the arms of the trigger rod projecting upwardly to support the wire 4 in raised position in the path of the animal, fish or fowl.

A doubled leaf spring 7 has its end portions embracing the upper portion of the shank 2, one arm of the spring bearing against the bar 1, and the other bearing upwardly against the jaws 5 and tending to swing the same upwardly, which is resisted by the loop or shoulder portion 11 when the trap is set. However, when the animal, fish or fowl contacts with the wire 4 and swings the trigger rod to one side or the other, this will release the jaws 5, and the same will be swung upwardly by the spring 7 to catch the animal, fish or fowl which is passing over the trap, the upper arm of the spring sliding upwardly along the jaws 5, and its upward movement being limited by shoulders 12 with which the jaws are provided.

I claim—

A trap embodying a frame having notched portions at its ends, a pair of jaws pivoted to the frame between its ends swingable toward one another, the free ends of said jaws being seatable in said notched portions, a spring between the frame and jaws for swinging the jaws toward one another, a trigger member extending longitudinally of the frame and journaled through said portions, said member having arms extending at an angle, one of said arms having a loop portion to bear upon the free end of one jaw for holding the jaws sprung apart, and an element connecting said arms.

CHESTER PETER PUES.